US009623749B2

(12) United States Patent
Chan

(10) Patent No.: US 9,623,749 B2
(45) Date of Patent: Apr. 18, 2017

(54) PORTABLE VEHICLE INFORMATION DEVICE, VEHICLE AND VEHICLE INFORMATION METHOD

(71) Applicant: HON HAI PRECISION INDUSTRY CO., LTD., New Taipei (TW)

(72) Inventor: Jui-Kwang Chan, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/754,184

(22) Filed: Jun. 29, 2015

(65) Prior Publication Data
US 2016/0221438 A1 Aug. 4, 2016

(30) Foreign Application Priority Data
Jan. 30, 2015 (TW) .............................. 104103139 A

(51) Int. Cl.
G06K 9/20 (2006.01)
B60K 35/00 (2006.01)
G01C 21/36 (2006.01)
G01C 21/26 (2006.01)

(52) U.S. Cl.
CPC ............ B60K 35/00 (2013.01); G01C 21/365 (2013.01); G01C 21/3697 (2013.01); B60K 2350/1088 (2013.01); B60K 2350/1096 (2013.01); B60K 2350/2052 (2013.01); B60K 2350/901 (2013.01); B60K 2350/965 (2013.01); G01C 21/265 (2013.01)

(58) Field of Classification Search
CPC ...... H04N 7/181; H04N 7/183; H04N 5/2253; B60Q 9/00; B60R 1/00; B60R 1/04; B60R 2300/308; B60R 2300/8066; B60R 2300/8093; B60R 1/001; B60K 2350/352; B60K 35/00; B60K 37/00
USPC ....... 701/36; 348/148, 211.13; 382/104, 274
See application file for complete search history.

(56) References Cited

U.S. PATENT DOCUMENTS

| 6,847,487 | B2 * | 1/2005 | Burgner ..................... B60R 1/12 345/7 |
| 8,525,703 | B2 * | 9/2013 | McCarthy ................. B60R 1/12 340/995.1 |
| 2008/0249712 | A1 * | 10/2008 | Wang ................... G01C 21/365 701/414 |
| 2016/0090041 | A1 * | 3/2016 | Nagasawa ................. B60R 1/00 345/7 |

FOREIGN PATENT DOCUMENTS

| CN | 102582577 A | 7/2012 |
| JP | 2007-295033 A | 11/2007 |

(Continued)

Primary Examiner — Dalena Tran
(74) Attorney, Agent, or Firm — Zhigang Ma

(57) ABSTRACT

A vehicle information gathering and control method includes determining a connection between a vehicle information device and a vehicle and turning on a power source when the vehicle information device is connected to the connector of the vehicle. Vehicle information is provided by a number of vehicle information providing devices of the vehicle and gathered when the vehicle information device is connected to the connector of the vehicle; and a projector is controlled to project the acquired vehicle information on a light adjusting film covering on a windshield of the vehicle to be viewed by a driver.

13 Claims, 4 Drawing Sheets

(56) References Cited

FOREIGN PATENT DOCUMENTS

| | | |
|---|---|---|
| JP | 2011-97534 A | 5/2011 |
| JP | 2012-78619 A | 4/2012 |
| JP | 2012-198052 A | 10/2012 |
| JP | 2013-67209 A | 4/2013 |
| JP | 2014-235053 A | 12/2014 |
| TW | 201307116 A1 | 2/2013 |
| WO | 2014/155590 A1 | 10/2014 |

* cited by examiner

PORTABLE VEHICLE INFORMATION DEVICE, VEHICLE AND VEHICLE INFORMATION METHOD

CROSS-REFERENCE TO RELATED APPLICATIONS

This application claims priority to Taiwanese Application No. 104103139 filed on Jan. 30, 2015, the contents of which are incorporated by reference herein.

FIELD

The subject matter herein generally relates to the field of data presentation in vehicles.

BACKGROUND

Many vehicle information providing devices are set in different positions of a vehicle to enable a driver to obtain more driving information or improve driving experience. For example, the vehicle information providing device of the vehicle usually includes a GPS device, a reversing display device, an automobile data recorder, a tire pressure monitoring system, and so on. However, the driver's attention may be distracted to see the driving information provided by so many vehicle information providing devices set on different positions of the vehicle during the driving process.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
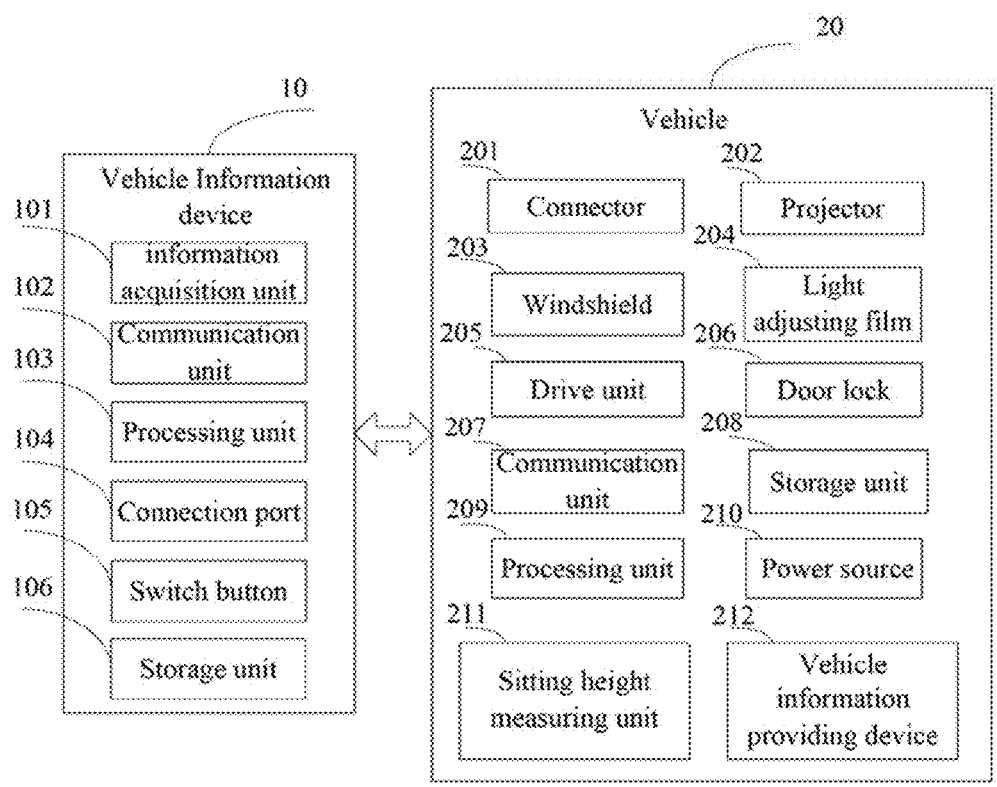
FIG. 1 is a block diagram of an embodiment of a vehicle information device and a vehicle.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY™, flash memory, and hard disk drives.

Figure 2:
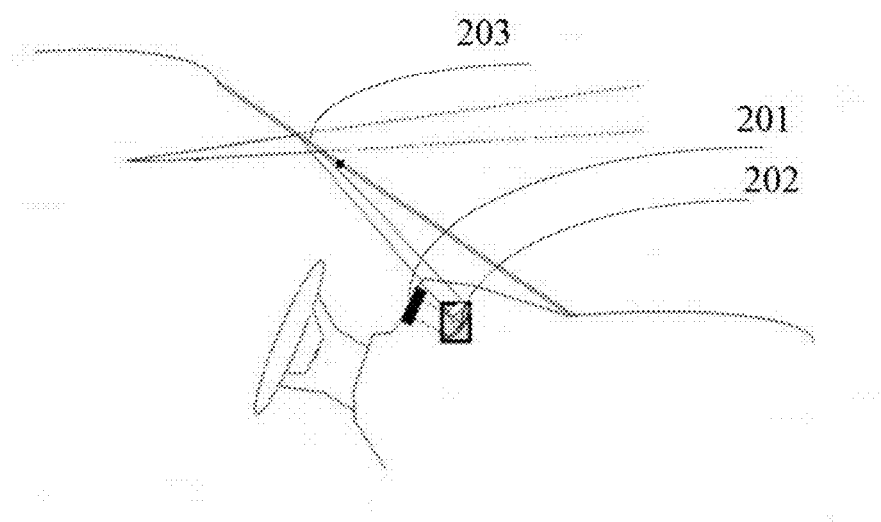
FIG. 2 is a context figure of an embodiment of a vehicle.

FIG. 1 is a block diagram of an embodiment of a vehicle information device 10 and a vehicle 20. The vehicle information device 10 is a portable device and is able to communicate with the vehicle 20. FIG. 2 is a context figure of an embodiment of a vehicle 20. The vehicle 20 includes a connector 201, a projector 202, and a windshield 203. The connector 201 and the projector 202 are both set on a console of the vehicle 20. In the embodiment, the projector 202 is a mini projector using digital light processing technology. The connector 201 is a communication port used to connect the vehicle information device 10 to the vehicle 20, and the vehicle information device 10 communicates with the vehicle 20 when the vehicle 20 connects to the vehicle 20 via the connector 201. In the embodiment, the vehicle information device 10 also can communicate with the vehicle 20 by WIFI® or BLUETOOTH® wireless network. The vehicle 20 also includes a number of vehicle information providing devices 212. Each vehicle information providing device 212 provides a kind of vehicle information. For example, the number of the vehicle information providing devices 212 include a GPS device which provides the location information of the vehicle 20, a reversing display device which captures and displays the scene behind the vehicle 20, and an automobile data recorder which provides video information of the driving process of the vehicle 20. The vehicle information device 10 is able to acquire the vehicle information provided by the number of vehicle information providing devices 212 when the vehicle information device 10 is connected to the vehicle 20 by the connector 201. The windshield 203 is covered with a light adjusting film 204, and the windshield 203 covered with the light adjusting film 204 functions as a projection screen of the projector 202. In the embodiment, the vehicle information device 10 acquires the vehicle information of the number of the vehicle information providing devices 212, and controls the projector 202 to project the acquired vehicle information on the windshield 203 of the vehicle 20 for a driver to view.

The vehicle information device 10 includes an information acquisition unit 101, a communication unit 102, a processing unit 103, a connection port 104, a switch button 105, and a storage unit 106. The information acquisition unit 101 captures user identity information of a user using the vehicle information device 10. In the embodiment, the information acquisition unit 101 is a fingerprint identification device. In other embodiment, the information acquisition unit 101 is a human face recognition device, and the like. The vehicle information device 10 communicates with the vehicle 20 via the communication unit 102. In the embodiment, the communicate unit 102 is a WIFI® or BLUETOOTH® communication module. The vehicle information device 10 also can be connected to the connector 201 of the vehicle 20 via the connection port 104.

The vehicle 20 also includes a drive unit 205, a door lock 206, a communication unit 207, a storage unit 208, a processing unit 209, and a power source 210. The drive unit 205 is used to lock or release the door lock 206. In the embodiment, the drive unit 205 is an electric motor. The vehicle 20 communicates with the vehicle information device 10 via the communication unit 207. In the embodiment, the communication unit 207 is a WIFI® or BLUETOOTH® communication module. The storage unit 208 stores user identity information of at least one validated user, such as fingerprint information or human face information of the at least one validated user. The processing unit 209 can be central processing unit, digital processor, single chip, and similar components. The power source 210 is used to supply power to the vehicle 20.

Figure 3:
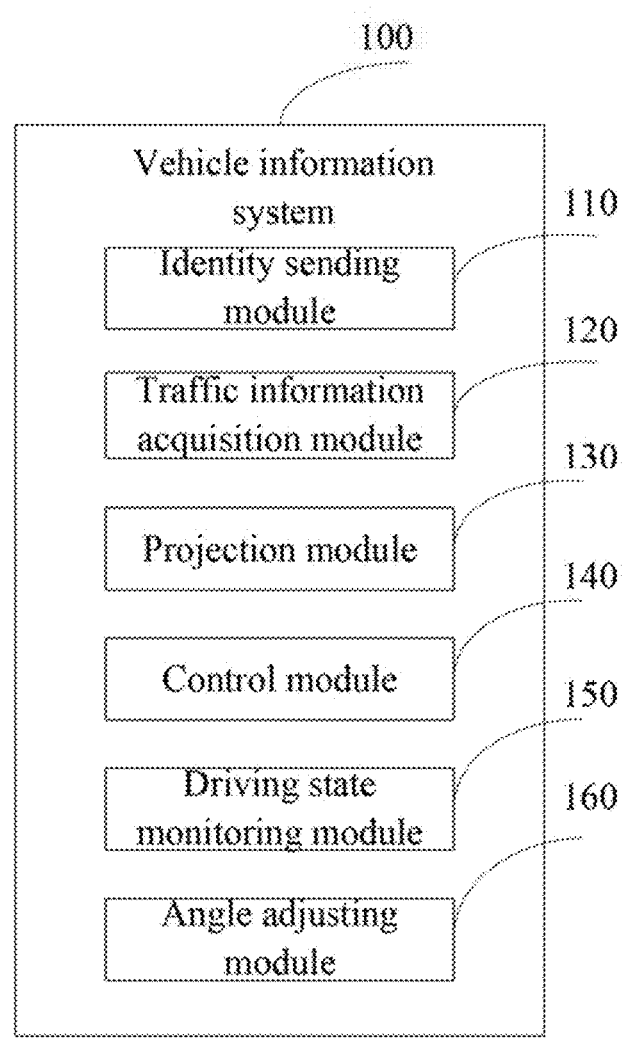
FIG. 3 is a block diagram of an embodiment of function modules of the vehicle information system.

FIG. 3 is a block diagram of one embodiment of function modules of the vehicle information system. The vehicle information system 100 is running in the vehicle information device 10 and the vehicle 20. The system 100 includes an identity sending module 110, a traffic information acquisition module 120, a projection module 130, a control module 140, a driving state monitoring module 150, and an angle adjusting module 160.

In the embodiment, the identity sending module 110, the traffic information acquisition module 120, and the projection module 130 can be collections of software instructions stored in the storage unit 106 of the vehicle information device 10 and executed by the processing unit 103 of the vehicle information device 10. The control module 140, the driving state monitoring module 150, and the angle adjusting module can be collections of software instructions stored in the storage unit 208 of the vehicle 20 and executed by the processing unit 209 of the vehicle. The identity sending module 110, the traffic information acquisition module 120, the projection module 130, the control module 140, the driving state monitoring module 150, and the angle adjusting module 160 also can include functionality represented as hardware or integrated circuits, or as software and hardware combinations, such as a special-purpose processor or a general-purpose processor with special-purpose firmware.

In one embodiment, the processing unit 103 can be a central processing unit, a digital signal processor, or a single chip, for example. In one embodiment, the storage unit 106 or 208 can be an internal storage system, such as a flash memory, a random access memory (RAM) for temporary storage of information, and/or a read-only memory (ROM) for permanent storage of information. The storage unit 106 or 208 can also be a storage system, such as a hard disk, a storage card, or a data storage medium. The storage unit 106 or 208 can include volatile and/or non-volatile storage devices. In at least one embodiment, the storage unit 106 or 208 can include two or more storage devices such that one storage device is a memory and the other storage device is a hard drive. Additionally, one or more of the storage units 106 or 208 can be respectively located either entirely or partially external relative to the vehicle information device 10 or the vehicle 20.

The identity sending module 110 acquires the user identity information captured by the information acquisition unit 101 and sends the acquired user identity information to the vehicle 20 via the communication unit 102.

The control module 140 receives the user identity information send by the vehicle information device 10, and compares the received user identity information with the stored user identity information of at least one validated user, and controls the drive unit 205 to open the door lock 206 of the vehicle 20 when the received user identity information matches with the stored user identity information.

The control module 140 determines whether the vehicle information device 10 is connected to the connector 201 and turns on the power source 210 to supply power to the vehicle 20 when determining that the vehicle information device 10 is connected to the connector of the vehicle 20. When the power source 210 is turned on, the power source 210 is able to supply power to the light adjusting film 204 and the number of vehicle information providing devices 212. In the embodiment, the vehicle 20 also includes a battery (not shown), the battery is used to supply power to the processing unit 209 and the drive unit 205 before the power source 210 is turned on. In another embodiment, the control module 140 turns on the power source 210 to supply power to the light adjusting film 204 and the number of vehicle information providing devices 212 when the vehicle information device 10 is near the vehicle 20 and is authorized to access the vehicle 20 as described above. Namely, the vehicle information device 10 is authorized to access the vehicle 20 when the user identity information received from the vehicle information device 10 matches with the stored user identity information.

That is, in another embodiment, when the vehicle information device 10 is near the vehicle 20, the control module 140 can control the drive unit 205 to open the door lock 206 of the vehicle 20, control to turn on the power source 210 to supply power to the light adjusting film 204 and the number of vehicle information providing devices 212, and authorize the vehicle information device 10 to access the vehicle 20 when the received user identity information matches with the stored user identity information.

The traffic information acquisition module 120 acquires the vehicle information provided by the number of vehicle information providing devices 212 of the vehicle 20 when the vehicle information device 10 is connected to the connector 201 of the vehicle 20 via the connection port 104. For example, if there are a GPS device and an automobile data recorder in the vehicle 20, the traffic information acquisition module 120 is able to acquire the location information of the vehicle 20 provided by the GPS device and the video information provided by the automobile data recorder.

The projection module 130 controls the projector 202 to project the vehicle information acquired by the traffic information acquisition module 120 on the light adjusting film 204 covering on the windshield 203, thus enabling the driver to view the vehicle information conveniently. In the embodiment, the projection module 130 arrays and distributes the acquired vehicle information in predetermined positions and projects the vehicle information on the light adjusting film 204 covering on the windshield 203 simultaneously.

In other embodiments, the projection module 130 projects an item of the vehicle information provided by the number of vehicle information providing devices 212 on the windshield 203 individually. That is, the projection module 130 projects the vehicle information on the windshield 203 one by one in a predetermined order or randomly. In some other embodiment, the vehicle information device 10 also includes a switch button 105, the projection module 130 changes the vehicle information projected on the windshield 203 in response to an operation of pressing the switch button 105 by the user.

In one embodiment, the vehicle 20 further includes a sitting height measuring unit 211. The sitting height measuring unit 211 is used to determine the user's sitting height.

In the embodiment, the sitting height measuring unit 211 is an infrared ray height tester. The storage unit 208 of the vehicle 20 stores a relationship table which defines relationships between user's sitting height ranges and angle adjusting commands.

The driving state monitoring module 150 acquires the user's sitting height information determined by the sitting height measuring unit 211.

The angle adjusting module 160 determines an angle adjusting command according to the acquired user's sitting height and the relationship table, and adjusts the angle of the projector 202 according to the determined angle adjusting command, thus ensuring that the user's line of sight is aligned to the projection area of the projector 202.

Figure 4:
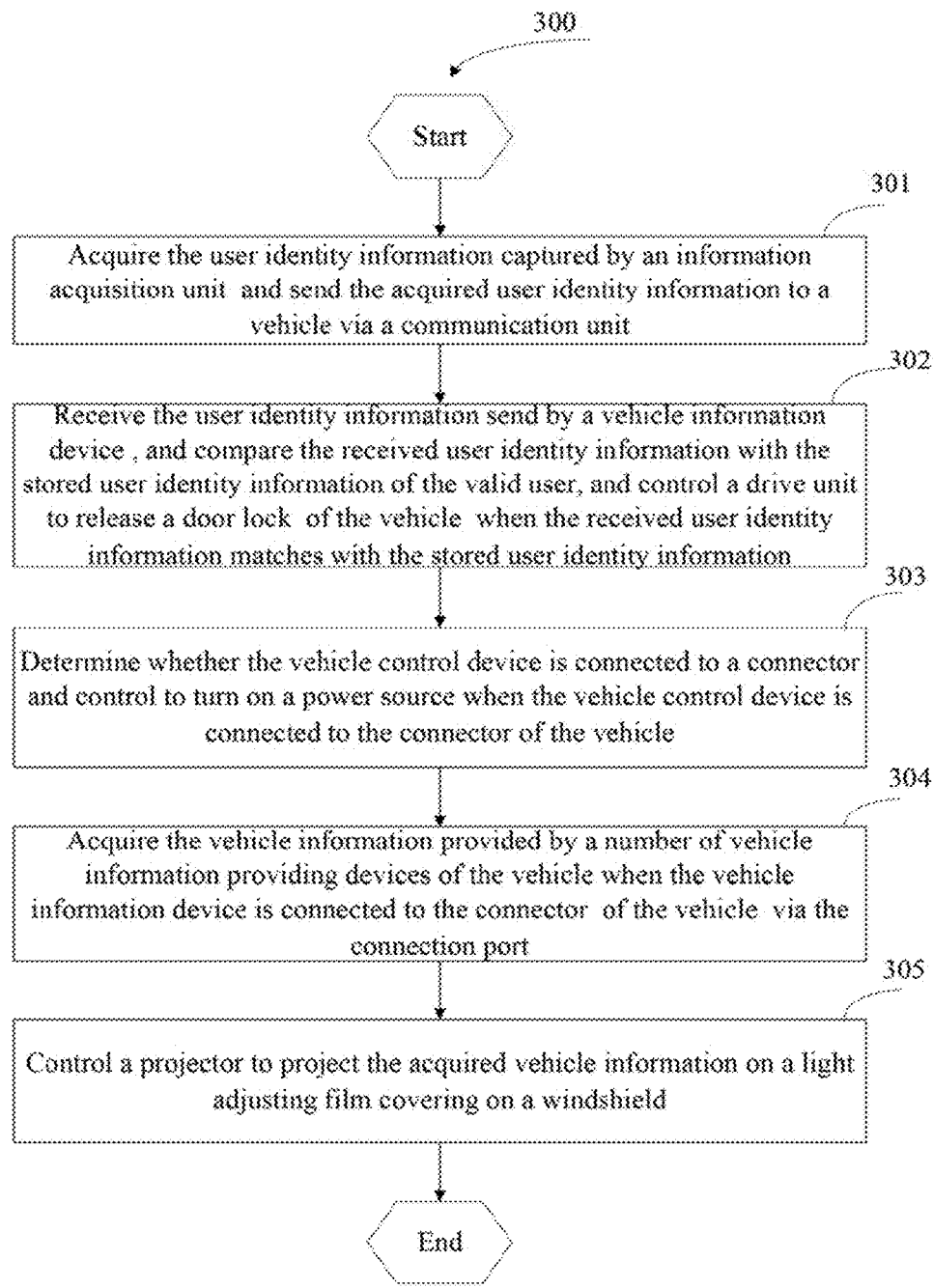
FIG. 4 is a flowchart of an embodiment of an vehicle information method.

FIG. 4 is a flowchart of one embodiment of a vehicle information method. An example vehicle information method 300 is provided by way of example, as there are a variety of ways to carry out the method. The example method 300 described below can be carried out using the configurations illustrated in FIGS. 1-2, and various elements of these figures are referenced in explaining the example method. Each block shown in FIG. 6 represents one or more processes, methods, or subroutines, carried out in the example method 300. Furthermore, the illustrated order of blocks is illustrative only and the order of the blocks can be changed. The example method 300 can begin at block 301. Depending on the embodiment, additional blocks can be utilized and the ordering of the blocks can be changed.

At block 301, an identity sending module acquires the user identity information captured by an information acquisition unit 101 and sends the acquired user identity information to a vehicle via a communication unit. In the embodiment, the information acquisition unit is a fingerprint identification device. In other embodiment, the information acquisition unit is a human face recognition device.

At block 302, a control module receives the user identity information sent by a vehicle information device, and compares the received user identity information with stored user identity information of at least one validated user, and controls a drive unit to open a door lock of the vehicle when the received user identity information matches with the stored user identity information.

At block 303, a control module determines whether the vehicle information device is connected to a connector and turns on a power source to supply power to the vehicle when determining that the vehicle information device is connected to the connector of the vehicle. When the power source is turned on, the power source is able to supply power to a light adjusting film and a number of vehicle information providing devices.

At block 304, a traffic information acquisition module acquires the vehicle information provided by the number of vehicle information providing devices of the vehicle when the vehicle information device is connected to the connector of the vehicle via the connection port.

At block 305, a projection module controls a projector to project the vehicle information acquired by the traffic information acquisition module onto a light adjusting film covering on a windshield, thus enabling the driver to view the vehicle information conveniently. In the embodiment, the projection module arrays the acquired vehicle information in predetermined positions and projects the arrayed vehicle information on the light adjusting film covering on the windshield simultaneously.

In other embodiments, the projection module projects an item of the vehicle information provided by the number of vehicle information providing devices on the windshield individually. That is, the projection module projects the vehicle information on the windshield one by one in a predetermined order or randomly. In some other embodiment, the vehicle information device also includes a switch button, the projection module changes the vehicle information projected on the windshield in response to an operation of pressing the switch button by the user.

In the embodiment, the method 300 further includes steps of a driving state monitoring module acquiring the user's sitting height as determined by a sitting height measuring unit and an angle adjusting module, for convenient viewing, determining an angle adjusting command according to the acquired user's sitting height, a relationship table which defines relationships between user's sitting height ranges and angle adjusting commands, and adjusting the angle of the projector according to the determined angle adjusting command, thus ensuring that the user's line of sight is aligned to the projection area of the projector.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A vehicle information device comprising:
   a connection port configured to connect to a connector of a vehicle, the connector of the vehicle being connected to a plurality of devices providing vehicle information of the vehicle;
   a processing unit configured to execute a plurality of modules, the plurality of modules comprising:
   a traffic information acquisition module configured to, upon execution by the processing unit, cause the processing unit to acquire vehicle information provided by the plurality of devices providing vehicle information of the vehicle when the vehicle information device is connected to the connector of the vehicle via the connection port; and
   a projection module configured to, upon execution by the processing unit, cause the processing unit to control a projector to project the vehicle information of each device providing vehicle information acquired by the traffic information acquisition module on a light adjusting film covering on a windshield simultaneously or individually.

2. The vehicle information device according to claim 1, wherein the projection module arrays the acquired vehicle information of each device providing vehicle information in predetermined positions and projects the arrayed vehicle information on the light adjusting film covering on the windshield simultaneously.

3. The vehicle information device according to claim 1, wherein the projection module projects the vehicle information provided by the plurality of vehicle information providing devices on the windshield individually.

4. The vehicle information device according to claim 1, further comprising a switch button, wherein the projection module changes the vehicle information of each device providing vehicle information projected on the windshield in response to an operation of pressing the switch button by a user.

5. The vehicle information device according to claim 1, further comprising an information acquisition unit and a communication unit, wherein the information acquisition unit is configured to capture user identity information of a user using the vehicle information device, the processing unit executes an identity sending module, the identity sending module is configured to acquire the user identity information captured by the information acquisition unit and send the acquired user identity information to the vehicle via the communication unit.

6. The vehicle information device according to claim 5, wherein the information acquisition unit is a fingerprint identification device or a human face recognition device.

7. A vehicle comprising:
a power source configured to supply power to the vehicle;
a plurality of vehicle information providing devices configured to provide the vehicle information;
a connector configured to be a communication port used to connect a vehicle information device to the vehicle;
a projector;
a sitting height measuring unit configured to determine an user's sitting height, and
a storage unit configured to store a relationship table which defines relationships between user's sitting height ranges and angle adjusting commands, and
a processing unit configured to execute a plurality of modules, the plurality of modules comprising:
a control module configured to determine whether the vehicle information device is connected to the connector and turn on the power source to supply power to the vehicle when determining the vehicle information device is connected to the connector of the vehicle;
a driving state monitoring module configured to acquire the user's sitting height information determined by the sitting height measuring unit; and
an angle adjusting module configured to determine an angle adjusting command according to the acquired user's sitting height and the relationship table, and adjust the angle of a projector according to the determined angle adjusting command.

8. The vehicle according to claim 7, further comprising a drive unit, a door lock, and a communication unit, wherein the control module receives user identity information send by a vehicle information device, and compares the received user identity information with stored user identity information, and controls the drive unit to release the door lock of the vehicle when the received user identity information matches with the stored user identity information.

9. A vehicle information method, running on a vehicle and a vehicle information device, the vehicle information method comprising:
detecting proximity of a vehicle information device to the vehicle by a control module of the vehicle;
turning on a plurality of vehicle information providing devices by the control module in response to the detecting;
acquiring the vehicle information provided by a plurality of vehicle information providing devices of the vehicle; and
controlling a projector to project the acquired vehicle information on a light adjusting film covering on a windshield by the vehicle information device;
acquiring user's sitting height information determined by a sitting height measuring unit; and
determining an angle adjusting command according to the acquired user's sitting height and a relationship table which defines relationships between user's sitting height ranges and angle adjusting commands, and adjusting the angle of the projector according to the determined angle adjusting command.

10. The vehicle information method according to claim 9, wherein the step of detecting proximity of a vehicle identification device to the vehicle comprising:
detecting whether the vehicle information device is connected to a connector of the vehicle, and determining the proximity of the vehicle information device is detected when detecting the vehicle information device is connected to the connector of the vehicle.

11. The vehicle information method according to claim 9, further comprising:
acquiring user identity information captured by an information acquisition unit and sending the acquired user identity information to a vehicle via a communication unit; and
receiving the user identity information send by a vehicle control vehicle and comparing the received user identity information with the stored user identity information of the valid user, and controlling a drive unit to release a door lock of the vehicle when the received user identity information matches with the stored user identity information.

12. The vehicle information method according to claim 11, wherein the step of detecting proximity of a vehicle identification device to the vehicle comprising:
authorizing the vehicle information device to access the vehicle when the received user identity information matches with the stored user identity information.

13. The vehicle information method according to claim 9, wherein the step of turning on a plurality of vehicle information providing devices in response to the detecting comprising:
turning on a power source to supply power to the plurality of vehicle information providing devices, thus to turn on the plurality of vehicle information providing devices.

* * * * *